United States Patent
Kashima (10) Patent No.: US 6,891,585 B2
(45) Date of Patent: May 10, 2005

(54) CIRCULARLY-POLARIZED-LIGHT-EXTRACTING OPTICAL ELEMENT HAVING CHLOSTERIC LAYER WITH CHANGING CHIRAL PITCH

(75) Inventor: Keiji Kashima, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/115,438

(22) Filed: Apr. 4, 2002

(65) Prior Publication Data

US 2002/0176167 A1 Nov. 28, 2002

(30) Foreign Application Priority Data

Apr. 4, 2001 (JP) ........................................ 2001-106226

(51) Int. Cl.⁷ ........................ G02F 1/1335; G02F 1/13; G02B 5/30
(52) U.S. Cl. ........................ 349/98; 349/115; 349/194; 359/500
(58) Field of Search ........................ 349/96, 98, 115, 349/194; 359/500

(56) References Cited

U.S. PATENT DOCUMENTS

| | | | | |
|---|---|---|---|---|
| 5,278,684 A | * | 1/1994 | Mochizuki et al. | 349/175 |
| 5,506,704 A | * | 4/1996 | Broer et al. | 349/98 |
| 5,691,789 A | * | 11/1997 | Li et al. | 349/98 |
| 5,899,551 A | * | 5/1999 | Neijzen et al. | 349/115 |
| 6,061,108 A | * | 5/2000 | Anderson et al. | 349/98 |
| 6,573,963 B2 | * | 6/2003 | Ouderkirk et al. | 349/117 |
| 2002/0167627 A1 | * | 11/2002 | Umeya | 349/96 |

FOREIGN PATENT DOCUMENTS

| | | |
|---|---|---|
| JP | 06-281814 | 10/1994 |
| JP | 07-258638 | 10/1995 |
| JP | 08-271731 | 10/1996 |
| JP | 09-133810 | 5/1997 |
| JP | 09-304770 | 11/1997 |
| JP | 10-508882 | 9/1998 |
| JP | 10-316755 | 12/1998 |
| JP | 10-319235 | 12/1998 |
| JP | 10-513578 | 12/1998 |
| JP | 11-044816 | 2/1999 |
| JP | 11-264907 | 9/1999 |
| JP | 11-293252 | 10/1999 |
| JP | 2000-193962 | 7/2000 |

OTHER PUBLICATIONS

Koide, Naoyuki and Sakamoto, Kunisuke. "Ekisho Porima." (or "Liquid Crystalline Polymers.") Kyoritsu Shuppan Kabushiki Kaisha, Japan, 1998. No translation available.

* cited by examiner

Primary Examiner—Tarifur R. Chowdhury
(74) Attorney, Agent, or Firm—Parkhurst & Wendel, L.L.P.

(57) ABSTRACT

Disclosed herein is a process of producing a circularly-polarized-light-extracting optical element adapted to effectively prevent the appearance of bright and dark stripes on the screen of a display to avoid lowering of the displaying quality of the display. The circularly-polarized-light-extracting optical element includes a glass substrate 11, an alignment layer 12 laminated to the glass substrate 11, and a cholesteric layer 13 formed on the alignment layer 12, in which molecules are aligned in the sate of planar alignment due to the alignment-regulating action of the surface of the alignment layer 12. The cholesteric layer 13 has a first surface 13a on its glass substrate 11 side, and a second surface 13b opposite to the first surface 13a. Director directions of molecules on the first surface 13a of the cholesteric layer 13 are aligned in substantially one direction owing to the alignment-regulating action of the surface of the alignment layer 12. Further, the chiral pitch in the cholesteric layer 13 varies so that the chiral pitch $p_2$ on the second surface 13b side is longer than the chiral pitch $p_1$ on the first surface 13a side.

7 Claims, 5 Drawing Sheets

PRIOR ART

FIG. 8

CIRCULARLY-POLARIZED-LIGHT-EXTRACTING OPTICAL ELEMENT HAVING CHLOSTERIC LAYER WITH CHANGING CHIRAL PITCH

BACKGROUND OF THE INVENTION

1. Field of the Invention

The present invention relates to a circularly-polarized-light-extracting optical element for use in a display such as a liquid crystal display. More particularly, the present invention relates to a process of producing a circularly-polarized-light-extracting optical element including a layer having a cholesteric structure (hereinafter referred to as a "cholesteric layer"), to such a circularly-polarized-light-extracting optical element, to a polarized-light-emitting device including the optical element, and to a liquid crystal display including the optical element.

2. Description of Related Art

A circularly-polarized-light-extracting optical element including a cholesteric liquid crystal layer has conventionally been known as an optical element for separating incident light into right-handed and left-handed polarized components and selectively reflecting or transmitting these circularly polarized components. In order to more efficiently utilize a component of light circularly polarized in a predetermined direction (right- or left-handed circularly polarized light) by such a circularly-polarized-light-extracting optical element, it has been demanded to improve the circularly-polarized-light-extracting optical element so that it can extract right- or left-handed circularly polarized light of wavelength in a wider wave range. To meet this demand, there has been proposed a circularly-polarized-light-extracting optical element composed of a laminate of a plurality of cholesteric liquid crystal layers with different chiral pitches (Japanese Laid-Open Patent Publications No. 271731/1996 and No. 264907/1999). Further, a polarized-light-emitting device including such a circularly-polarized-light-extracting optical element, and a liquid crystal display including the same have been proposed as well (Japanese Laid-Open Patent Publication No. 304770/1997).

Figure 8:
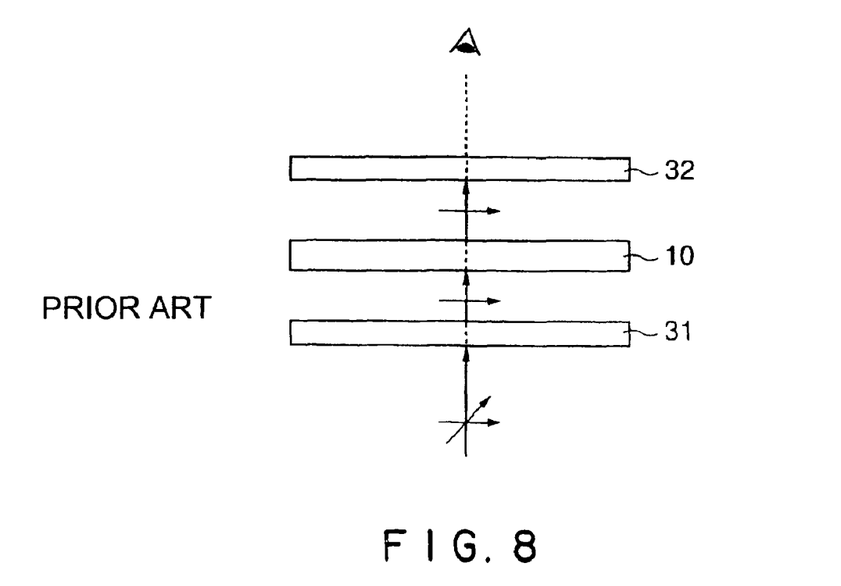
FIG. 8 is a diagrammatic view illustrating the use of a circularly-polarized-light-extracting optical element.

If the above-described circularly-polarized-light-extracting optical element is used for a display such as a liquid crystal display, it is essential that the condition of polarization be uniform throughout the surface of the circularly-polarized-light-extracting optical element. In a liquid crystal display or the like, a circularly-polarized-light-extracting optical element 10 is, as shown in FIG. 8, placed between polarizing plates 31 and 32 such as linear or elliptical polarizers that are arranged in the cross nicol disposition (in such a disposition that the axes of transmission of the two polarizing plates cross at a right angle); and the displaying state of the display changes with the state of a liquid crystal cell (not shown in the figure) sandwiched between the polarizing plates 31 and 32. The above liquid crystal display is designed so that the polarizing plates 31 and 32 can completely shield incident light to prevent light leakage when the liquid crystal cell (not shown in the figure) is in such a state that it fully transmits polarized light.

However, it has been found the following fact: since the condition of polarization is not uniform throughout the surface of a circularly-polarized-light-extracting optical element 10 incorporated in a practical display, bright and dark stripes appear on the screen of the display even in the case where polarizing plates 31 and 32 are expected to fully shield incident light; and the displaying quality of the display is thus drastically lowered.

SUMMARY OF THE INVENTION

Through experiments, computer simulations, etc., the inventors tried to clear up the cause of the above-described undesirable phenomenon; and, as a result, they have found that the main cause of the phenomenon is the directions of orientation of molecules (director directions of molecules) on the surface of a circularly-polarized-light-extracting optical element. The present invention has been accomplished on the basis of this finding.

An object of the present invention is therefore to provide a process of producing a circularly-polarized-light-extracting optical element adapted to effectively prevent the appearance of bright and dark stripes on the screen of a display to avoid lowering of the displaying quality of the display even when the circularly-polarized-light-extracting optical element is placed between a pair of polarizing plates arranged in the cross nicol disposition. Another object of the present invention is to provide the above-described circularly-polarized-light-extracting optical element. A further object of the present invention is to provide a polarized-light-emitting device including the circularly-polarized-light-extracting optical element. A still further object of the present invention is to provide a liquid crystal display including the circularly-polarized-light-extracting optical element.

The present invention provides, as a first aspect, a process of producing a circularly-polarized-light-extracting optical element, comprising the steps of: coating a substrate with a polymerizable material, and orienting the polymerizable material by the alignment-regulating action of the surface of the substrate, which acts in substantially one direction; and three-dimensionally crosslinking the polymerizable material oriented, while causing the cholesteric structure formed by the polymerizable material to have a chiral pitch varying in the direction of thickness of the substrate, thereby forming a cholesteric layer in which the chiral pitch on its first surface side, which is on the substrate side, is shorter than that on its second surface side opposite to the first surface side.

The present invention provides, as a second aspect, a process of producing a circularly-polarized-light-extracting optical element, comprising the steps of: coating a substrate with a polymerizable material, and orienting the polymerizable material by the alignment-regulating action of the surface of the substrate, which acts in substantially one direction; three-dimensionally crosslinking the polymerizable material oriented, thereby forming a first coating cholesteric film with a predetermined chiral pitch; directly applying a laminating polymerizable material to the first coating cholesteric film, and orienting the laminating polymerizable material by the alignment-regulating action of the surface of the first coating cholesteric film; and three-dimensionally crosslinking the laminating polymerizable material, thereby forming, on the first coating cholesteric film, a second coating cholesteric film with a chiral pitch longer than that in the first coating cholesteric film.

The present invention provides, as a third aspect, a process of producing a circularly-polarized-light-extracting optical element, comprising the steps of: coating a substrate with a liquid crystalline polymer, and orienting the liquid crystalline polymer by the alignment-regulating action of the surface of the substrate, which acts in substantially one direction; and transforming the oriented liquid crystalline polymer into the glassy state by cooling, while causing the cholesteric structure formed by the liquid crystalline polymer to have a chiral pitch varying in the direction of thickness of the substrate, thereby forming a cholesteric layer in which the chiral pitch on its first surface side, which is on the substrate side, is shorter than that on its second surface side opposite to the first surface side.

The present invention provides, as a fourth aspect, a process of producing a circularly-polarized-light-extracting optical element, comprising the steps of: coating a substrate with a liquid crystalline polymer, and orienting the liquid crystalline polymer by the alignment-regulating action of the surface of the substrate, which acts in substantially one direction; transforming the oriented liquid crystalline polymer into the glassy state by cooling, thereby forming a first coating cholesteric film with a predetermined chiral pitch; directly applying a laminating liquid crystalline polymer to the first coating cholesteric film, and orienting the laminating liquid crystalline polymer by the alignment-regulating action of the surface of the first coating cholesteric film; and transforming the oriented laminating crystalline polymer into the glassy state by cooling, thereby forming, on the first coating cholesteric film, a second coating cholesteric film with a chiral pitch longer than that in the first coating cholesteric film.

The present invention provides, as a fifth aspect, a circularly-polarized-light-extracting optical element comprising: a substrate; and a cholesteric layer formed on the substrate, the cholesteric layer being oriented by the alignment-regulating action of the surface of the substrate, wherein the cholesteric layer has a first surface and a second surface opposite to the first surface, director directions of molecules on the first surface are aligned in substantially one direction owing to the alignment-regulating action of the surface of the substrate, and the chiral pitch on the second surface side of the cholesteric layer is longer than that on the first surface side.

In the above-described fifth aspect, it is preferable that the chiral pitch in the cholesteric layer gradually varies from the first surface side to the second surface side. It is also preferable that the cholesteric layer be composed of a laminate of a plurality of coating cholesteric films. It is also preferable that the cholesteric layer partially transmits either right- or left-handed circularly polarized component of incident light, having wavelength in the selective reflection wave range. In addition, it is preferable to choose the chiral pitch in the cholesteric layer on its second surface side so that the selective reflection wave range on the second surface side will be 687 nm or more.

The present invention provides, as a sixth aspect, a polarized-light-emitting device comprising a circularly-polarized-light-extracting optical element according to the above-described fifth aspect; a light guide that causes light entering from its side to emerge from either its top or bottom, thereby projecting this emergent light on the circularly-polarized-light-extracting optical element; and a light source that emits light towards the side of the light guide.

The present invention provides, as a seventh aspect, a liquid crystal display comprising a polarized-light-emitting device according to the above-described sixth aspect; and a liquid crystal cell that receives polarized light emitted from the polarized-light-emitting device and transmits the polarized light while varying polarized light transmittance.

According to the present invention, the chiral pitch in the cholesteric layer on its second surface side, from which polarized light emerges, is made longer than that on the first surface side, on which director directions of molecules are aligned in substantially one direction. Therefore, the uniformity of twist angle in the cholesteric layer on its second surface side is improved; and the condition of polarization on the surface of the circularly-polarized-light-extracting optical element becomes uniform. For this reason, in the case where the circularly-polarized-light-extracting optical element is used for a display such as a liquid crystal display, even if it is placed between polarizing plates such as linear or elliptical polarizers that are arranged in the cross nicol disposition, it can effectively prevent the appearance of bright and dark stripes on the screen of the display to avoid lowering of the displaying quality of the display.

DETAILED DESCRIPTION OF PREFERRED EMBODIMENTS

By referring to the accompanying drawings, embodiments of the present invention will be described hereinafter.

First Embodiment

First of all, a circularly-polarized-light-extracting optical element according to the first embodiment of the present invention will be described hereinafter by referring to FIGS. 1A and 1B.

Figure 1A:
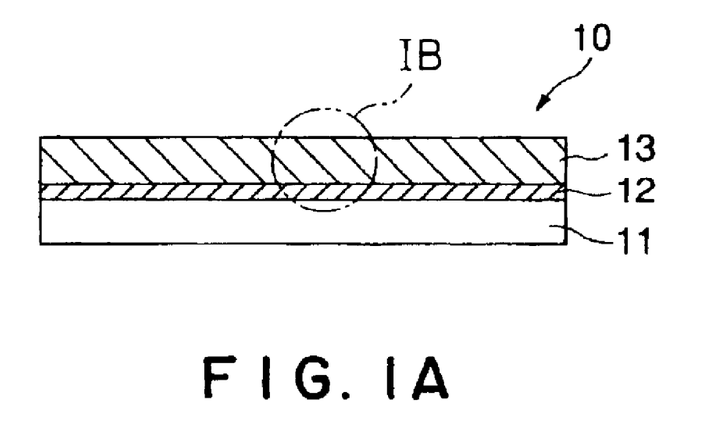
FIGS. 1A and 1B are diagrammatic cross-sectional views illustrating a first embodiment of the circularly-polarized-light-extracting optical element according to the present invention.
Figure 1B:
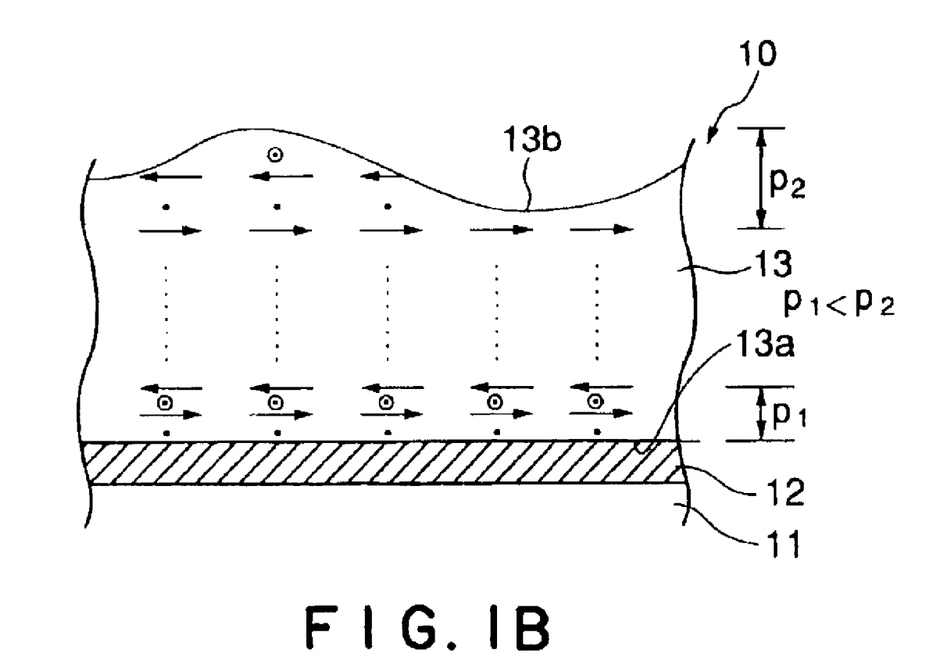

FIG. 1A is a diagrammatic view showing a circularly-polarized-light-extracting optical element according to the first embodiment of the present invention; and FIG. 1B is an enlarged view diagrammatically showing part IB in FIG. 1A. As shown in FIGS. 1A and 1B, the circularly-polarized-light-extracting optical element 10 according to the first embodiment of the invention is composed of a glass substrate 11, an alignment layer 12 laminated to the glass substrate 11, and a layer 13 having a cholesteric structure (cholesteric layer) in which director directions of molecules are aligned in the state of planar alignment owing to the alignment-regulating action of the surface of the alignment layer 12. It is noted that the glass substrate 11 and the alignment layer 12 constitute a substrate for base.

The cholesteric layer 13 takes, as a physical molecular arrangement, a spiral structure (cholesteric structure) in which the director directions of molecules continuously rotate in helical fashion in the direction of thickness of the cholesteric layer 13. The cholesteric layer 13 has the property of selecting polarized light (the property of separating polarized light) by which light incident on the cholesteric layer 13 is separated, according to the above physical molecular arrangement, into a component circularly polarized (optically rotated) in one direction and a component circularly polarized in the opposite direction. Light entering into this cholesteric layer 13 along its helical axis is split into a component circularly polarized in the right (right-handed polarized light) and a component circularly polarized in the left (left-handed polarized light); one of these components is transmitted, and the other one is reflected. This phenomenon is widely known as circular dichroism. When the direction of optical rotation of the circularly polarized components is properly selected in terms of incident light, the component circularly polarized in the same direction as that of the helical axis of the cholesteric structure of the cholesteric layer 13 is selectively reflected.

The scattering of rotated light that is reflected becomes maximum at the wavelength $\lambda_0$ defined by the following equation (1):

$$\lambda_0 = n_{av} \cdot p \tag{1}$$

wherein p is a chiral pitch (helical pitch), and $n_{av}$ is a mean refractive index on a plane perpendicular to the helical axis.

Further, the width $\Delta\lambda$ of the wave band of the reflected light is represented by the following equation (2):

$$\Delta\lambda = \Delta n \cdot p \tag{2},$$

wherein $\Delta n$ is an index of double reflection, and p is a chiral pitch.

Namely, either right- or left-handed circularly polarized component of light whose wavelength is in the range centering around the wavelength $\lambda_0$ and having the width $\Delta\lambda$ is reflected by the cholesteric layer 13, and the other circularly polarized component of light and light whose wavelength does not fall in the above range are transmitted. Upon reflection, the right- or left-handed circularly polarized component is reflected as it is without undergoing inversion of the direction of optical rotation unlike in the case of ordinary reflection of light.

The cholesteric layer 13 has a first surface 13a on the glass substrate 11 side and a second surface 13b on the other side. Director directions of molecules on the first surface 13a of the cholesteric layer 13 are aligned in substantially one direction as shown in FIG. 1B, owing to the alignment-regulating action of the surface of the alignment layer 12. In FIG. 1B, the arrows show the director directions of molecules. As the cases that director directions of molecules are aligned in one direction, there are two cases that: a case where the director directions of aligned molecules completely agree with each other; and a case where the director directions of aligned molecules are different from each other by an angle of 180°. This is because, in many cases, the head of a molecule is optically indistinguishable from the tail of the same. Whether director directions of molecules are aligned in substantially one direction can be known by observing the cross section of the cholesteric layer 13 by a transmission electron microscope. In this microscopic observation, bright and dark stripes are observed corresponding to the pitch characteristic of the cholesteric structure. Therefore, if the surface is seen with almost uniform concentration (brightness), it can be known that director directions of molecules on the surface are aligned in substantially one direction.

Further, the chiral pitch in the cholesteric layer 13 varies so that the chiral pitch $p_2$ on the second surface 13b side is longer than the chiral pitch $p_1$ on the first surface 13a side as shown in FIG. 1B. Owing to this change in chiral pitch, the cholesteric layer 13 can have a broadened selective reflection wave range. Furthermore, the chiral pitch $p_2$ on the second surface 13b side, from which polarized light emerges, is made longer than the chiral pitch $p_1$ on the first surface 13a side, on which director directions of molecules are aligned in substantially one direction. Therefore, even when the cholesteric layer 13 is formed by means of coating equipment with which a film is formed with a thickness distribution of ±3%, non-uniformity of twist angle (inequality of the director directions of molecules) in the cholesteric layer 13 on its second surface 13b side scarcely arises from the roughness of the second surface 13b. From the standpoint of not creating an optically discontinuous plane at an intermediate part of the cholesteric layer 13 between the first surface 13a and the second surface 13b, it is preferable to gradually vary the chiral pitch in the cholesteric layer 13 from the first surface 13a side to the second surface 13b side.

The cholesteric layer 13 may be made thick enough to fully reflect either right- or left-handed circularly polarized component of incident light (with a maximum reflectivity of 100%). Moreover, like the polarized-light-reflecting layer of the display described in Japanese Laid-Open Patent Publication No. 193962/2000, the cholesteric layer 13 may also be made to have a thickness smaller than that required to reflect polarized light with maximum reflectivity so that it can partially reflect either right- or left-handed circularly polarized component of incident light (with a maximum reflectivity of less than 95%). In the latter case, the effects of the present invention are fully obtained because of the following reason: in the selective reflection wave range of the cholesteric layer 13, the cholesteric layer 13 transmits not only a component of light circularly polarized in one direction but also a component of light circularly polarized in the opposite direction depending upon the thickness of the cholesteric layer 13 (the latter circularly polarized component is transmitted more easily when the thickness of the cholesteric layer 13 is thinner); the effects of the present invention are thus extended even to the latter circularly polarized component.

Furthermore, it is preferable to choose the chiral pitch $p_2$ in the cholesteric layer 13 on its second surface 13b side so that the selective reflection wavelength on the second surface 13b side will be sufficiently long. If the chiral pitch is so chosen, the effects of the present invention are fully obtained. The reason for this is as follows: in the case where the cholesteric layer 13 is formed by the use of coating equipment with which a film is formed with a thickness distribution of ±3%, it is possible to lessen the non-uniformity of twist angle (the inequality of the director directions of molecules) on the second surface 13b side by making the chiral pitch in the cholesteric layer 13 as long as possible (making the selective reflection wavelength as long as possible), if the distribution of film thickness is the same. In particular, if the selective reflection wavelength on the second surface 13b of the cholesteric layer 13 is made 687 nm or more and if a circularly-polarized-light-extracting optical element 10 including such a cholesteric layer 13 is used for a display, the non-uniformity of twist angle becomes almost negligible. This is because the spectral visibility of the human eye at a wavelength of 687 nm or more is 1/100 or less of that at a wavelength of 555 nm, at which the spectral visibility peaks. It is more preferable to make the selective reflection wavelength on the second surface 13b of the cholesteric layer 13 be 720 nm or more. This is because since the spectral visibility of the human eye at a wavelength of 720 nm or more is only 1/1000 of the maximum, the non-uniformity of twist angle becomes fully negligible. If the circularly-polarized-light-extracting optical element 10 is used for a display, it is preferable to make the selective reflection wavelength on the first surface 13a of the cholesteric layer 13 be 429 nm or less, more preferably 409 nm or less in order to cover the whole visible light range.

To form the cholesteric layer 13, a polymerizable monomer or oligomer (polymerizable material) may be used. A liquid crystalline polymer may also be used.

Examples of polymerizable monomers useful for forming the cholesteric layer 13 include liquid crystalline monomers and mixtures of chiral compounds as described in Japanese Laid-Open Patent Publication No. 258638/1995 and Published Japanese Translation No. 508882/1998 of PCT International Publication. Examples of polymerizable oligomers that can be used to form the cholesteric layer 13 include cyclic organopolysiloxane compounds having cholesteric phases as described in Japanese Laid-Open Patent Publication No. 165480/1982.

Examples of liquid crystalline polymers suitable for forming the cholesteric layer 13 include polymers having mesogen groups, which make polymers liquid crystalline, in the main chain, in the side chains, or in both the main and side chains; high-molecular-weight cholesteric liquid crystals having cholesteryl groups introduced into the side chains; and liquid crystalline polymers as described in Japanese Laid-Open Patent Publications No. 133810/1997 and No. 293252/1999.

By referring to FIGS. 1A and 1B again, a process of producing the circularly-polarized-light-extracting optical element 10 according to the first embodiment of the present invention, comprising the above-described constituents, will be described.

(First Example of the Process)

A production process in which a polymerizable monomer or oligomer is used for forming the cholesteric layer 13 will firstly be described.

In this production process, an alignment layer 12 that has been subjected to aligning process is firstly formed on a glass substrate 11.

Next, a polymerizable monomer or oligomer is applied to the alignment layer 12, and is heated, as needed, thereby aligning the molecules of the polymerizable monomer or oligomer by the alignment-regulating action of the surface of the alignment layer 12, which acts in substantially one direction. The polymerizable monomer or oligomer applied thus forms a liquid crystal phase. Heating conducted in the above step is to hold the polymerizable monomer or oligomer in the temperature range of liquid crystal phase for a while; it may be conducted for several seconds to 5 minutes, preferably for 30 to 90 seconds, as needed. In the case where the polymerizable monomer or oligomer is made into a liquid crystal phase at a prescribed temperature, the liquid crystal phase is nematic. If any chiral agent is added to this nematic liquid crystal, a chiral nematic liquid crystal (cholesteric liquid crystal) can be obtained, where it is preferable to add a chiral agent in an amount of approximately several to 10% of the liquid crystal. By varying the chiral power by changing the type of the chiral agent to be added, or by varying the concentration of the chiral agent, it is possible to control the selective reflection wave range, which is determined by the cholesteric structure of the polymerizable monomer or oligomer.

The polymerizable monomer or oligomer molecules aligned are then polymerized by three-dimensional crosslinking; and, at the same time, the cholesteric structure formed by the polymerizable monomer or oligomer molecules is made to have a chiral pitch varying in the direction of thickness of the glass substrate 11 (alignment layer 12), thereby obtaining a cholesteric layer 13 in which the chiral pitch $p_1$ on its first surface 13a side, which is on the glass substrate 11 (alignment layer 12) side, is shorter than the chiral pitch $p_2$ on its second surface 13b side opposite to the first surface 13a side. The polymerizable monomer or oligomer molecules may be three-dimensionally crosslinked in the following manner: a photopolymerization initiator is added to the polymerizable monomer or oligomer, and this mixture is cured by the application of ultraviolet light; or electron rays are directly applied to the polymerizable monomer or oligomer for curing. By "three-dimensional cross-linking" is herein meant that a polymerizable monomer or oligomer is three-dimensionally polymerized so that the resulting polymer can have a network structure. If such a network structure is formed, the cholesteric liquid crystalline state can optically be fixed, and a film that is easy to handle as an optical film and stable at normal temperatures can be obtained. Further, to vary the chiral pitch within the cholesteric layer 13, there may be employed such a method that the polymerized cholesteric layer 13 is immersed in a toluene solution or the like to extract the chiral agent in a greater amount from the first surface 13a side of the cholesteric layer 13, thereby providing a chiral agent concentration gradient in the cholesteric layer 13. Besides this method, those methods described in Japanese Laid-Open Patent Publications No. 281814/1994 and No. 316755/1998 may also be employed.

In such a production process, the polymerizable monomer or oligomer for forming the cholesteric layer 13 may be made into a coating liquid by dissolving it in a solvent. If such a coating liquid is used, it is necessary to add the drying step of evaporating the solvent before the step of three-dimensionally cross-linking the polymerizable monomer or oligomer molecules.

Further, in this production process, by allowing the alignment-regulating action of the surface of the alignment layer 12 to act in substantially one direction, director directions of molecules on the first surface 13a of the cholesteric layer 13, which is in contact with the alignment layer 12, come to align in substantially one direction. The alignment layer 12 may be formed by any of conventionally known methods such as: (1) a method in which a polyimide film is formed on the glass substrate 11, and is then rubbed; (2) a method in which a polymeric compound useful for forming an optical alignment layer is applied to the glass substrate 11, and ultraviolet light, which is polarized light, is applied to the polymeric compound layer formed; and (3) a method using a stretched PET film.

(Second Example of the Process)

A production process in which a liquid crystalline polymer is used to form the cholesteric layer 13 will be described.

In this production process, an alignment layer 12 that has been subjected to aligning process is firstly formed on a glass substrate 11.

Next, a liquid crystalline polymer is applied to the alignment layer 12, and is heated, as needed, thereby orienting the liquid crystalline polymer by the alignment-regulating action of the surface of the alignment layer 12, which acts in substantially one direction. The liquid crystalline polymer applied thus forms a liquid crystal phase. Heating conducted in the above step is to hold the liquid crystalline polymer in the temperature range of liquid crystal phase for a while. Useful herein as the liquid crystalline polymer is a cholesteric liquid crystalline polymer itself having chirality or a mixture of a nematic liquid crystalline polymer and a cholesteric liquid crystalline polymer. The selective reflection wave range, which is determined by the cholesteric structure of the liquid crystalline polymer, can herein be controlled in the following manner: in the case where a cholesteric liquid crystalline polymer is used, the chiral power of the polymer molecules is controlled by such a conventional method that the content of bent chains containing chiral components is adjusted or that the copolymerization ratio of a mesogen monomer to a chiral mesogen monomer is adjusted (see Naoyuki KOIDE and Kunisuke SAKAMOTO: *EKISHO PORIMA* (or "Liquid Crystalline Polymers"), Kyoritsu Shuppan Kabushiki Kaisha, Japan, 1998); while when a mixture of a nematic liquid crystalline polymer and a cholesteric liquid crystalline polymer is used, the mixing ratio of these two liquid crystalline polymers is adjusted.

The liquid crystalline polymer oriented is then transformed into the glassy state by cooling; and the cholesteric structure of the liquid crystalline polymer is made to have a chiral pitch varying in the direction of thickness of the glass substrate 11 (alignment layer 12), thereby obtaining a cholesteric layer 13 in which the chiral pitch $p_1$ on its first surface 13a side, which is on the glass substrate 11 (alignment layer 12) side, is shorter than the chiral pitch $p_2$ on its second surface 13b side opposite to the first surface 13a side. It is noted that the state of a liquid crystalline polymer changes with temperature. For instance, a liquid crystalline polymer having a glass transition temperature of 90° C. and an isotropic transition temperature of 200° C. is cholesteric at a temperature between 90° C. and 200° C.; when this polymer is cooled to room temperature, it becomes glassy, and this glassy state is fixed with the cholesteric structure of the polymer maintained. To vary the chiral pitch in the cholesteric layer 13, the method described in Japanese Laid-Open Patent Publication No. 319235/1998 or the like can be employed.

In such a production process, the liquid crystalline polymer for forming the cholesteric layer 13 may be made into a coating liquid by dissolving it in a solvent. If such a coating liquid is used, it is necessary to add, before the cooling step, the drying step of evaporating the solvent.

Further, in this production process, by allowing the alignment-regulating action of the surface of the alignment layer 12 to act in substantially one direction, director directions of molecules on the first surface 13a of the cholesteric layer 13, which is in contact with the alignment layer 12, come to align in substantially one direction. The alignment layer 12 may be formed by any of conventionally known methods such as: (1) a method in which a polyimide film is formed on the glass substrate 11, and is then rubbed; (2) a method in which a polymeric compound useful for forming an optical alignment layer is applied to the glass substrate 11, and ultraviolet light, which is polarized light, is applied to the polymeric compound layer formed; and (3) a method using a stretched PET film.

Thus, in the first embodiment of the present invention, the chiral pitch $p_2$ in the cholesteric layer 13 on its second surface 13b side, from which polarized light emerges, is made longer than the chiral pitch $p_1$ on the first surface 13a side, on which director directions of molecules are aligned in substantially one direction. Therefore, the second surface 13b of the cholesteric layer 13 has decreased non-uniformity of twist angle; and the condition of polarization on the surface of the circularly-polarized-light-extracting optical element 10 becomes uniform. For this reason, in the case where the circularly-polarized-light-extracting optical element 10 is used for a display such as a liquid crystal display, even if it is placed between polarizing plates 31 and 32 such as linear or elliptical polarizers that are arranged in the cross nicol disposition as shown in FIG. 8, it can effectively prevent the appearance of bright and dark stripes on the screen of the display to avoid lowering of the displaying quality of the display.

Further, according to the first embodiment of the present invention, it is also possible to let the cholesteric layer 13 partially transmit either right- or left-handed circularly polarized component of incident light, having a wavelength in the selective reflection wave range. In this case, it is possible to effectively prevent the appearance of bright and dark stripes that is brought about by the above one circularly polarized component transmitted depending on the thickness of the cholesteric layer 13 (the component is transmitted more easily when the thickness of the cholesteric layer is thinner).

Furthermore, according to the first embodiment of the present invention, if the chiral pitch $p_2$ in the cholesteric layer 13 on its second surface 13b side is chosen so that the selective reflection wavelength on the second surface 13b side becomes sufficiently long, the chiral pitch on the second surface 13b side becomes sufficiently long. Therefore, the non-uniformity of twist angle (the inequality of the director directions of molecules) on the second surface 13b side is further decreased. In particular, if the selective reflection wavelength of the cholesteric layer 13 on its second surface 13b side is made 687 nm or more and if a circularly-polarized-light-extracting optical element 10 including such a cholesteric layer 13 is used for a display, the non-uniformity of twist angle becomes almost negligible. This is because the spectral visibility of the human eye at a wavelength of 687 nm or more is $\frac{1}{100}$ or less of that at a wavelength of 555 nm, at which the spectral visibility peaks.

In the aforementioned first embodiment of the present invention, the cholesteric layer 13 laminated to the glass substrate 11 (alignment layer 12) is used as the circularly-polarized-light-extracting optical element 10. However, the cholesteric layer 13 separated from the glass substrate 11 (alignment layer 12) may also be used singly.

Second Embodiment

Referring now to FIGS. 2 to 6, a second embodiment of the present invention will be described. The second embodiment of the invention is basically the same as the first embodiment of the invention shown in FIGS. 1A and 1B, except that a cholesteric layer 13 in the second embodiment is composed of a laminate of a plurality of coating cholesteric films 13' and 13". It is noted that like reference characters designate like or corresponding parts in the accompanying drawings and that those parts that have been described in connection with the first embodiment shown in FIGS. 1A and 1B will not be explained any more in detail in the description of the second embodiment.

Figure 2:
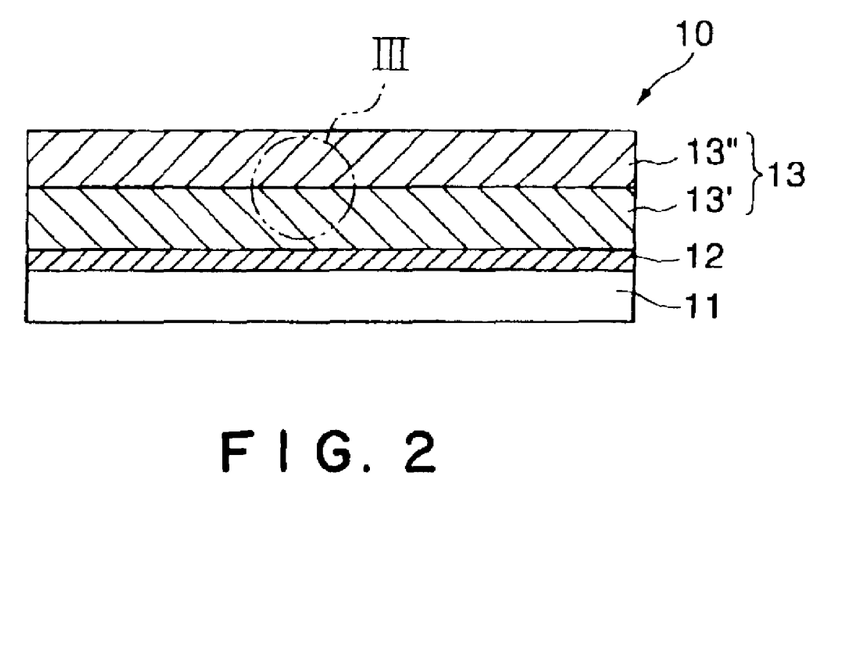
FIG. 2 is a diagrammatic cross-sectional view illustrating a second embodiment of the circularly-polarized-light-extracting optical element according to the present invention.
Figure 3:
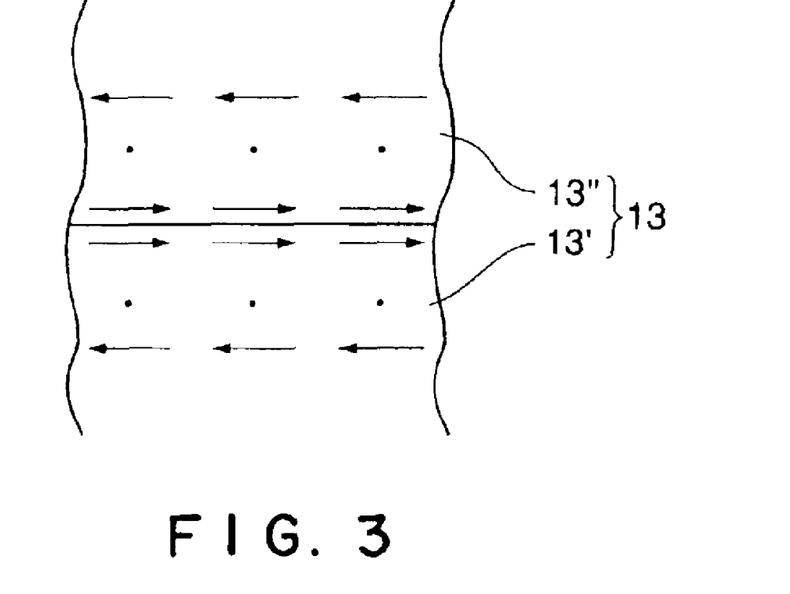
FIG. 3 is a diagrammatic cross-sectional view showing the state of the face-to-face surfaces of two adjacent coating films in the circularly-polarized-light-extracting optical element shown in FIG. 2.
Figure 4:
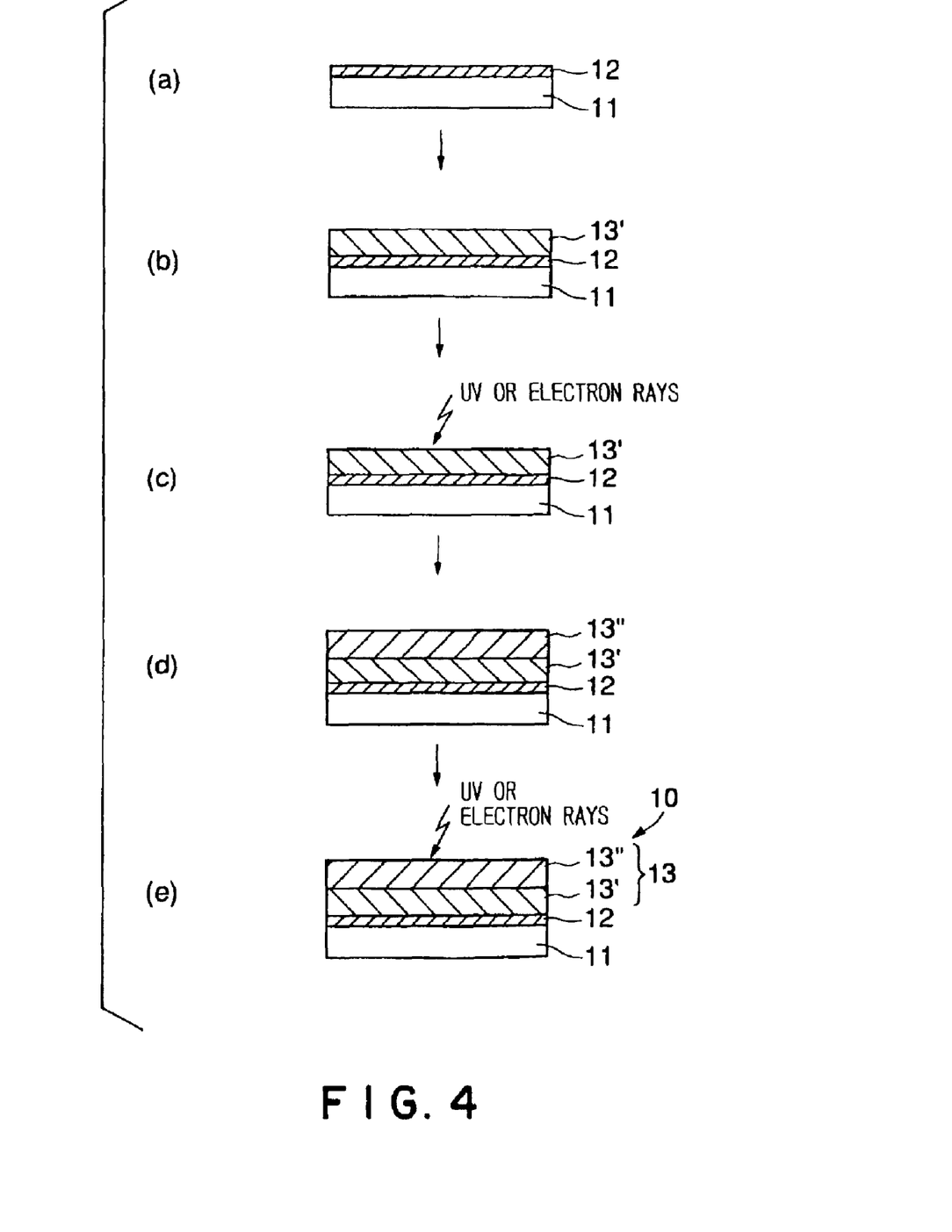
FIG. 4 is a diagrammatic cross-sectional view illustrating a first example of the process of producing the circularly-polarized-light-extracting optical element shown in FIG. 2.
Figure 5:
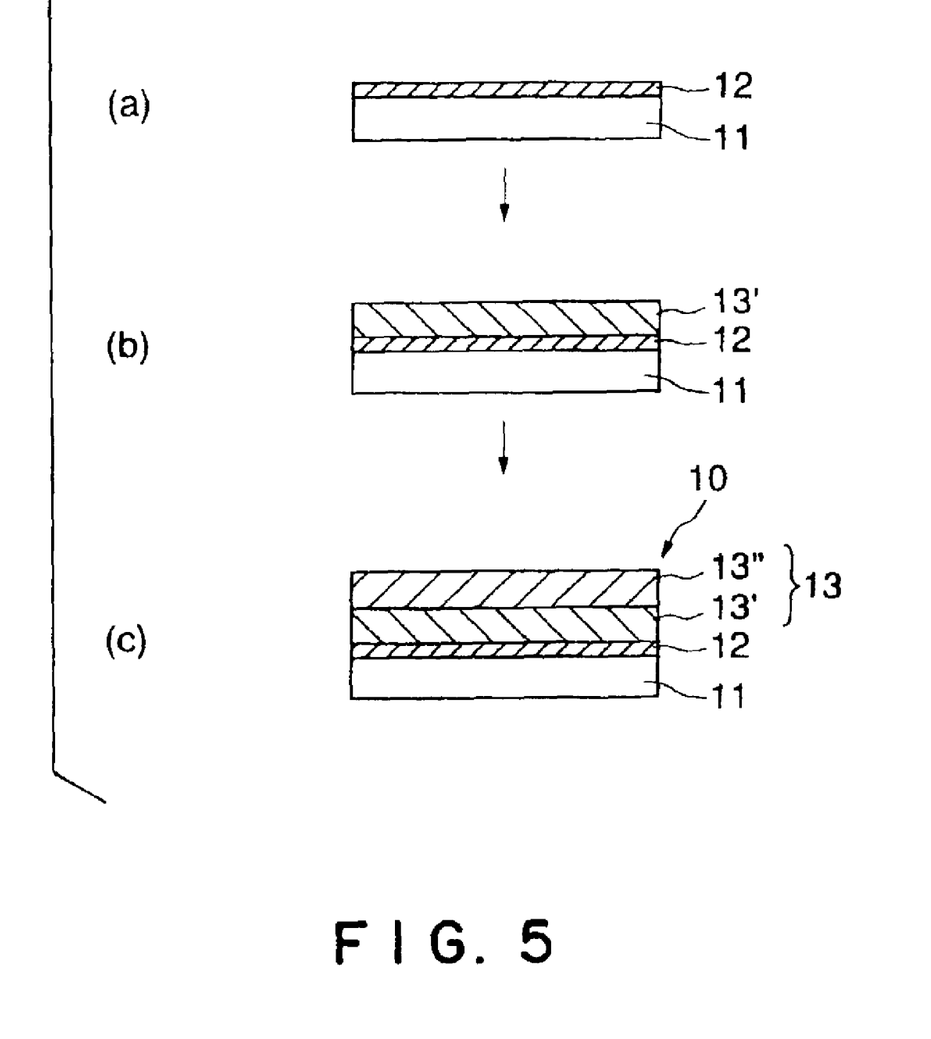
FIG. 5 is a diagrammatic cross-sectional view illustrating a second example of the process of producing the circularly-polarized-light-extracting optical element shown in FIG. 2.

FIG. 2 is a diagrammatic view showing a circularly-polarized-light-extracting optical element according to the second embodiment of the present invention; and FIG. 3 is an enlarged view diagrammatically showing part III in FIG. 2. As shown in FIGS. 2 and 3, a circularly-polarized-lightextracting optical element 10 according to the second embodiment of the present invention is composed of a glass substrate 11, an alignment layer 12 laminated to the glass substrate 11, and a layer 13 having a cholesteric structure (cholesteric layer) in which director directions of molecules are aligned in the state of planar alignment owing to the alignment-regulating action of the surface of the alignment layer. It is noted that the glass substrate 11 and the alignment layer 12 constitute a substrate for base.

The cholesteric layer 13 is composed of a laminate of a plurality of coating cholesteric films 13' and 13" with different chiral pitches. Moreover, the director directions of molecules on the face-to-face surfaces of the two adjacent coating cholesteric films 13' and 13" agree with each other as shown in FIG. 3. In addition, the chiral pitch in the coating cholesteric film 13" on the side opposite to the glass substrate 11 (alignment layer 12) is longer than that in the coating cholesteric film 13' on the glass substrate 11 (alignment layer 12) side.

A process of producing the circularly-polarized-light-extracting optical element 10 according to the second embodiment of the present invention, comprising the above-described components, will be described hereinafter.

(First Example of the Process)

By referring to FIGS. 4(a), 4(b), 4(c), 4(d) and 4(e), a production process in which a polymerizable monomer or oligomer is used to form the cholesteric layer 13 will be described.

In this production process, an alignment layer 12 that has been subjected to aligning process is firstly formed on a glass substrate 11 (FIG. 4(a)).

Next, like in the above-described first embodiment of the invention, a polymerizable monomer or oligomer is applied to the alignment layer 12, and is heated, as needed, thereby aligning the polymerizable monomer or oligomer molecules by the alignment-regulating action of the surface of the alignment layer 12, which acts in substantially one direction (FIG. 4(b)).

The polymerizable monomer or oligomer molecules aligned are then polymerized by three-dimensional crosslinking like in the above-described first embodiment of the invention, thereby forming a first coating cholesteric film 13' with a predetermined chiral pitch (FIG. 4(c)).

Thereafter, a laminating polymerizable monomer or oligomer is directly applied to the first coating cholesteric film 13' formed, and is heated, as needed, thereby aligning the laminating polymerizable monomer or oligomer molecules by the alignment-regulating action of the surface of the coating cholesteric film 13' (FIG. 4(d)).

Finally, the laminating polymerizable monomer or oligomer molecules are three-dimensionally crosslinked like in the formation of the first coating cholesteric film 13', thereby forming, on the first coating cholesteric film 13', a second coating cholesteric film 13" with a chiral pitch longer than that in the first coating cholesteric film 13' (FIG. 4(e)). It is possible to control the chiral pitches (selective reflection wave ranges) in the coating cholesteric films 13' and 13", by changing the concentrations of chiral agents in the polymerizable monomers or oligomers.

In such a production process, the polymerizable monomers or oligomers that are used for forming the coating cholesteric films 13' and 13" may be made into coating liquids by dissolving them in solvents. If such coating liquids are used, it is necessary to add the drying step of evaporating the solvent before the step of three-dimensionally cross-linking the polymerizable monomer or oligomer molecules.

Further, in this production process, by allowing the alignment-regulating action of the surface of the alignment layer 12 to act in substantially one direction, director directions of molecules on the first surface 13a of the cholesteric layer 13 (coating cholesteric film 13'), which is in contact with the alignment layer 12, come to align in substantially one direction. The alignment layer 12 may be formed by any of conventionally known methods such as: (1) a method in which a polyimide film is formed on the glass substrate 11, and is then rubbed; (2) a method in which a polymeric compound useful for forming an optical alignment layer is applied to the glass substrate 11, and ultraviolet light, which is polarized light, is applied to the polymeric compound layer; and (3) a method using a stretched PET film.

(Second Example of the Process)

A production process in which a liquid crystalline polymer is used to form the cholesteric layer 13 will be described by referring to FIGS. 5(a), 5(b) and 5(c).

In this production process, an alignment layer 12 that has been subjected to aligning process is firstly formed on a glass substrate 11 (FIG. 5(a)).

Next, like in the aforementioned first embodiment of the invention, a liquid crystalline polymer is applied to the alignment layer 12, and is heated, as needed, thereby orienting the liquid crystalline polymer by the alignment-regulating action of the surface of the alignment layer 12, which acts in substantially one direction.

The liquid crystalline polymer oriented is then transformed into the glassy state by cooling like in the above-described first embodiment, thereby forming a first coating cholesteric film 13' with a predetermined chiral pitch (FIG. 5(b)).

Thereafter, a laminating liquid crystalline polymer is directly applied to the first coating cholesteric film 13', and is heated, as needed, thereby orienting the laminating liquid crystalline polymer by the alignment-regulating action of the surface of the first coating cholesteric film 13'.

Finally, like in the formation of the first coating cholesteric film 13', the laminating liquid crystalline polymer is transformed into the glassy state by cooling, thereby forming, on the first coating cholesteric film 13', a second coating cholesteric film 13" with a chiral pitch longer than that in the first coating cholesteric film 13' (FIG. 5(c)). The chiral pitches (selective reflection wave ranges) in the coating cholesteric films 13' and 13" can be controlled by changing the chiral power of the liquid crystalline polymer molecules by such a conventional method that the content of bent chains containing chiral components is adjusted or that the copolymerization ratio of a mesogen monomer to a chiral mesogen monomer is adjusted (see Naoyuki KOIDE and Kunisuke SAKAMOTO: *EKISHO PORIMA* (or "Liquid Crystalline Polymers"), Kyoritsu Shuppan Kabushiki Kaisha, Japan, 1998).

In such a production process, the liquid crystalline polymers for forming the coating cholesteric films 13' and 13", may be made into coating liquids by dissolving them in solvents. If such coating liquids are used, it is necessary to add, before the cooling step, the drying step of evaporating the solvents.

Further, in this production process, by allowing the alignment-regulating action of the surface of the alignment layer 12 to act in substantially one direction, director directions of molecules on the first surface 13a of the cholesteric layer 13 (coating cholesteric film 13'), which is in contact with the alignment layer 12, come to align in substantially one direction. The alignment layer 12 may be formed by any of conventionally known methods such as: (1) a method in which a polyimide film is formed on the glass substrate 11, and is then rubbed; (2) a method in which a polymeric compound useful for forming an optical alignment layer is applied to the glass substrate 11, and ultraviolet light, which is polarized light, is applied to the polymeric compound layer; and (3) a method using a stretched PET film.

Thus, according to the second embodiment of the present invention, since the cholesteric layer 13 is composed of a laminate of a plurality of coating cholesteric films 13' and 13", the effects of the aforementioned first embodiment can successfully be obtained. Moreover, a circularly-polarized-light-extracting optical element 10 having a broadened selective reflection wave range can simply be obtained by the use of a cholesteric layer 13 formed by laminating a plurality of coating cholesteric films 13' and 13" with different chiral pitches.

Figure 6:
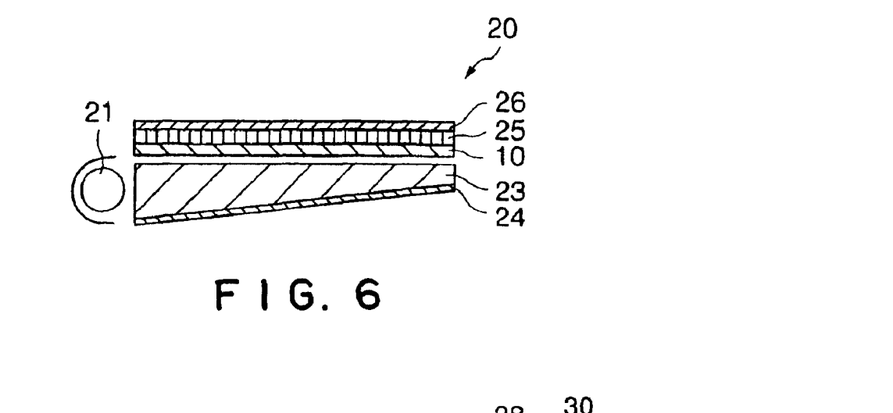
FIG. 6 is a diagrammatic cross-sectional view showing an example of the polarized-light-emitting device including the circularly-polarized-light-extracting optical element according to the present invention.
Figure 7:
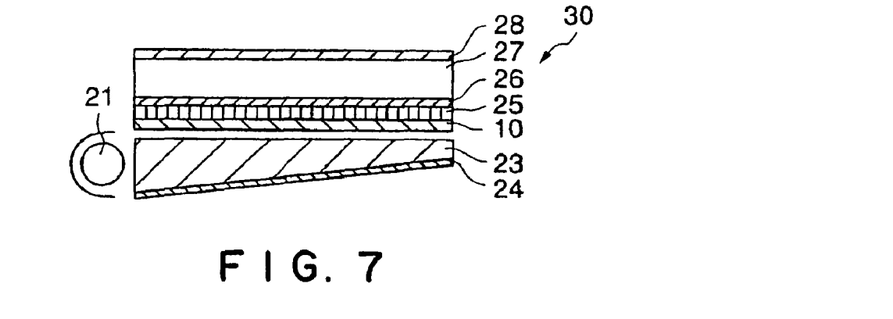
FIG. 7 is a diagrammatic cross-sectional view showing an example of the liquid crystal display including the circularly-polarized-light-extracting optical element according to the present invention.

The circularly-polarized-light-extracting optical element 10 according to the above-described first or second embodiment of the invention can be incorporated in a polarized-light-emitting device 20 as shown in FIG. 6, or in a liquid crystal display 30 as shown in FIG. 7. A polarized-light-emitting device or liquid crystal display which has surface uniformity in the condition of polarization can thus be obtained.

As shown in FIG. 6, the polarized-light-emitting device 20 includes a circularly-polarized-light-extracting optical element 10 according to the first or second embodiment of the invention; a light guide 23 for allowing light that has entered from its side to emerge from either its top or bottom, thereby projecting this emergent light on the circularly-polarized-light-extracting optical element 10; a light source 21 for emitting light towards the side of the light guide 23; and a reflector 24 for reflecting the light emerging from the bottom of the light guide 23. In this device, the circularly-polarized-light-extracting optical element 10 is provided on top of the light guide 23, so that light emitted by the light source 21 emerges as polarized light. On top of the circularly-polarized-light-extracting optical element 10, a retardation plate 25 and a polarizing plate 26 are respectively provided.

As shown in FIG. 7, the liquid crystal display 30 includes the above-described polarized-light-emitting device 20, and a liquid crystal cell 27 for receiving the light emitted from the polarized-light-emitting device 20 and transmitting it while varying polarized light transmittance. A polarizing plate 28 is provided on top of the liquid crystal cell 27.

EXAMPLES

The foregoing first and second embodiments of the present invention will now be explained more specifically by referring to the following Examples.

Example 1

92 parts of a monomer containing, in its molecule, polymerizable acrylates at the both ends and spacers between a mesogen existing at the center and the acrylates, having a nematic-isotropic transition temperature of 110° C., and 8 parts of a chiral agent having, in its molecule, polymerizable acrylate at one end were dissolved in toluene. To this toluene solution was added a photopolymerization initiator in an amount of 2% by weight of the above monomer. (With respect to the liquid crystal thus obtained, it was confirmed that the director directions of molecules would be aligned on an alignment layer in directions within a range of the direction of rubbing ±5 degrees.)

Separately, a transparent glass substrate was spin-coated with polyimide dissolved in a solvent. After drying, a film of the polyimide was formed at 200° C. (film thickness 0.1 μm), and was rubbed in a definite direction to obtain an alignment layer.

The glass substrate provided with the alignment layer was set in a spin-coater; and the alignment layer was spin-coated with the above-described toluene solution.

The toluene contained in the toluene solution applied was then evaporated at 80° C. to form a coating film on the alignment layer. It was visually confirmed by way of selective reflection of light that this coating film was cholesteric.

Ultraviolet light was applied to the above coating film to let the photopolymerization initiator contained in the coating film generate radicals, by which the acrylates in the monomer molecules were polymerized by three-dimensional cross-linking to form a coating cholesteric film on the alignment layer. The thickness of this coating cholesteric film was 2 μm±3%. By the measurement made by using a spectrophotometer, it was found that the selective reflection wave range was from 600 to 670 nm.

Example 2

The coating cholesteric film (circularly-polarized-light-extracting optical element) obtained in Example 1, adhered to the alignment layer formed on the glass substrate was immersed in a toluene solution. After a little while, this was withdrawn, and was dried at 80° C. The thickness of the coating cholesteric film was 2 μm±3%. By the measurement made by using a spectrophotometer, it was found that the selective reflection wave range was from 600 to 690 nm.

Example 3

The coating cholesteric film (circularly-polarized-light-extracting optical element) obtained in Example 1 was immersed in a toluene solution for a period of time longer than that in Example 2, and was then dried at 80° C. By the measurement made by using a spectrophotometer, it was found that the selective reflection wave range was from 600 to 720 nm.

The cross sections of the cholesteric layers (coating cholesteric films) of the circularly-polarized-light-extracting optical elements of Examples 1 to 3 were observed by a transmission electron microscope. As a result, it was found that the bright and dark stripes (corresponding to the pitch) that appeared on the glass-substrate-side surface of each cholesteric layer were parallel with each other (this shows that the helical axes are aligned in one direction) and that the chiral pitch on the glass-substrate-side surface was shorter than that on the other surface of the cholesteric layer. These results show that the selective reflection wave range was shifted to the longer wavelength side because the chiral agent crosslinked to the monomer molecules by a force weaker than that by which the nematic monomer molecules were crosslinked was extracted into the toluene solution in which each circularly-polarized-light-extracting optical element had been immersed.

Example 4

90 parts-of a monomer containing, in its molecule, polymerizable acrylates at the both ends and spacers between a mesogen existing at the center and the acrylates, having a nematic-isotropic transition temperature of 110° C., and 10 parts of a chiral agent having, in its molecule, polymerizable acrylate at one end were dissolved in toluene. To this toluene solution was added a photopolymerization initiator in an amount of 5% by weight of the above monomer. (With respect to the liquid crystal thus obtained, it was confirmed that the director directions of molecules would be aligned on an alignment layer in directions within a range of the direction of rubbing ±5 degrees.)

Separately, a transparent glass substrate was spin-coated with polyimide dissolved in a solvent. After drying, a film of the polyimide was formed at 200° C. (film thickness 0.1 µm), and was rubbed in a definite direction to obtain an alignment layer.

The glass substrate provided with the alignment layer was set in a spin-coater; and the alignment layer was spin-coated with the above-described toluene solution under such conditions that the thickness of the resulting coating film would be as uniform as possible.

The toluene contained in the toluene solution applied was then evaporated at 80° C. to form a coating film on the alignment layer. It was visually confirmed by way of selective reflection of light that this coating film was cholesteric.

Ultraviolet light was applied to the above coating film to let the photopolymerization initiator contained in the coating film generate radicals, by which the acrylates in the monomer molecules were polymerized by three-dimensional cross-linking to form a first coating cholesteric film on the alignment layer. The thickness of this coating cholesteric film was 2 µm±3%. By the measurement made by using a spectrophotometer, it was found that the center of the selective reflection wave range was in the vicinity of 600 nm.

At an increased number of revolutions of the spin coater, the first coating cholesteric film was spin-coated with the same toluene solution as the above-described one except that the amount of the chiral agent added was 6 parts.

The toluene contained in the toluene solution applied was evaporated at 80° C. to form a coating film on the first coating cholesteric film. It was visually confirmed by way of selective reflection of light that this coating film formed was cholesteric.

Ultraviolet light was applied to the above coating film to let the photopolymerization initiator contained in the coating film generate radicals, by which the acrylates in the monomer molecules were polymerized by three-dimensional cross-linking to form a second coating cholesteric film on the alignment layer. The thickness of this second coating cholesteric film was 3.5 µm±3%. By the measurement made by using a spectrophotometer, it was found that the center of the selective reflection wave range of the second coating cholesteric film was in the vicinity of 690 nm.

Example 5

A liquid crystalline polymer containing acrylic side chains, having a glass transition temperature of 80° C. and an isotropic transition temperature of 200° C. was dissolved in toluene. (With respect to the liquid crystal thus obtained, it was confirmed that the director directions of molecules would be aligned on an alignment layer in directions within a range of the direction of rubbing ±5 degrees.)

Separately, a transparent glass substrate was spin-coated with polyimide dissolved in a solvent. After drying, a film of the polyimide was formed at 200° C. (film thickness 0.1 µm), and was rubbed in a definite direction to obtain an alignment layer.

The glass substrate provided with the alignment layer was set in a spin-coater; and the alignment layer was spin-coated with the above-prepared toluene solution under such conditions that the thickness of the resulting coating film would be as uniform as possible.

The toluene contained in the toluene solution applied was then evaporated at 90° C.; and the coating film formed on the alignment layer was held at 150° C. for 10 minutes. It was visually confirmed by way of selective reflection of light that the coating film on the alignment layer was cholesteric. This coating film was cooled to room temperature to transform it into the glassy state, thereby forming a first coating cholesteric film. The thickness of this coating cholesteric film was 2 µm±3%. By the measurement made by using a spectrophotometer, it was found that the center of the selective reflection wave range was in the vicinity of 600 nm.

At an increased number of revolutions of the spin coater, the first coating cholesteric film was spin-coated with a toluene solution of a liquid crystalline polymer containing acrylic side chains, having a glass transition temperature of 83° C. and an isotropic transition temperature of 210° C.

The toluene contained in the toluene solution applied was evaporated at 80° C. to form a coating film on the first coating cholesteric film. It was visually confirmed by way of selective reflection of light that this coating film was cholesteric.

Thereafter, the toluene contained in the toluene solution applied was evaporated at 90° C.; and the coating film formed on the alignment layer was held at 130° C. for 10 minutes. It was visually confirmed by way of selective reflection of light that the coating film on the alignment layer was cholesteric. This coating film was cooled to room temperature to transform it into the glassy state, thereby forming a second coating cholesteric film. The thickness of this second coating cholesteric film was 3.5 µm±3%. By the measurement made by using a spectrophotometer, it was found that the center of the selective reflection wave range of the second coating cholesteric film was in the vicinity of 690 nm.

The cross sections of the cholesteric layers (coating cholesteric films) of the circularly-polarized-light-extracting optical elements of Examples 4 and 5 were observed by a transmission electron microscope. As a result, it was found that, in each cholesteric layer, the bright and dark stripes that appeared on the face-to-face surfaces of the two adjacent polymerized coating cholesteric films were parallel with each other (this shows that the helical axes are aligned in one direction) and that there was no discontinuity in the cholesteric layer. These results demonstrate that the director directions on the face-to-face surfaces of the two adjacent coating cholesteric films agree with each other. Further, in the measurement made by using a spectrophotometer, no optical peculiarity was observed in transmission.

(Results of Evaluation)

The circularly-polarized-light-extracting optical elements 10 of Examples 1 to 5 were evaluated in the following manner: as shown in FIG. 8, polarizing plates 31 and 32 such as linear or elliptical polarizers were arranged in the cross nicol disposition; each circularly-polarized-light-extracting optical element 10 was placed between these polarizing plates 31, 32; and the resultant was visually observed in terms of the degree of appearance of bright and dark stripes on the surface of the polarizing plate. The results were as follows: the circularly-polarized-light-extracting optical element 10 of Example 2 was better than that of Example 1; the circularly-polarized-light-extracting optical element 10 of Example 3 was better than that of Example 2; the circularly-polarized-light-extracting optical element 10 of Example 4 was better than that of Example 1; and the circularly-polarized-light-extracting optical element 10 of Example 5 was equivalent to that of Example 4.

What is claimed is:

1. A circularly-polarized-light-extracting optical element comprising:
   a substrate functioning as a base; and
   a cholesteric layer formed on the substrate, the cholesteric layer being a hardened layer formed on the substrate by a hardened liquid crystal material and being oriented by an alignment-regulating action of the surface of the substrate,
   wherein the cholesteric layer has a first surface that is placed on a side of the substrate and a second surface that is free and opposite to the first surface, director directions of molecules on the first surface of the cholesteric layer are aligned in substantially one direction owing to the alignment-regulating action of the surface of the substrate, and a chiral pitch on the second surface side of the cholesteric layer is longer than that on the first surface side, so that non-uniformity of polarization of light caused by the passage of light through the optical element is eliminated.

2. The circularly-polarized-light-extracting optical element according to claim 1, wherein the chiral pitch in the cholesteric layer gradually varies from the first surface side to the second surface side.

3. The circularly-polarized-light-extracting optical element according to claim 1, wherein the cholesteric layer is composed of a laminate of a plurality of coating cholesteric films.

4. The circularly-polarized-light-extracting optical element according to claim 1, wherein the cholesteric layer partially transmits either right- or left-handed circularly polarized component of incident light, having wavelength in a selective reflection wave range.

5. The circularly-polarized-light-extracting optical element according to claim 1, wherein the chiral pitch in the cholesteric layer on its second surface side is chosen so that a selective reflection wavelength on the second surface side will be 687 nm or more.

6. A polarized-light-emitting device comprising:
   a circularly-polarized-light-extracting optical element according to claim 1;
   a light guide that causes light entering from its side to emerge from either its top or bottom, thereby projecting this emergent light on the circularly-polarized-light-extracting optical element; and
   a light source that emits light towards the side of the light guide.

7. A liquid crystal display comprising:
   a polarized-light-emitting device according to claim 6; and
   a liquid crystal cell that receives polarized light emitted from the polarized-light-emitting device and transmits the polarized light while varying polarized light transmittance.

* * * * *